United States Patent
Barnhart

[11] Patent Number: 5,933,955
[45] Date of Patent: Aug. 10, 1999

[54] METHOD OF MAKING A DRIVE SPROCKET BY WATER JET MACHINING

[75] Inventor: Bruce W. Barnhart, Roseville, Mich.

[73] Assignee: The United States of America as represented by the Secretary of the Army, Washington, D.C.

[21] Appl. No.: 08/960,764

[22] Filed: Oct. 30, 1997

[51] Int. Cl.[6] .................................................. B23P 17/00
[52] U.S. Cl. ...................................... 29/893.35; 29/893.3
[58] Field of Search .............................. 29/893.3, 893.35; 83/53, 177; 451/39, 40

[56] References Cited

U.S. PATENT DOCUMENTS

| 338,961 | 3/1886 | Hart | 29/893.3 |
|---|---|---|---|
| 4,078,445 | 3/1978 | Kiser, Jr. | 29/893.3 |

FOREIGN PATENT DOCUMENTS

| 1822813 | 6/1993 | Sweden | 83/177 |
|---|---|---|---|

*Primary Examiner*—P. W. Echols
*Attorney, Agent, or Firm*—Peter A. Taucher; David L. Kuhn

[57] ABSTRACT

A method of making a robust sprocket for a tracked combat vehicle includes forming flat steel plates from stock metallurgically dissimilar to and harder than that of the track shoes, the thickness of the plates being at least 0.72 times the axial width of track shoe pockets engaging teeth of the sprocket. The sprocket's teeth are formed by water jet machining, so that the metallurgy of the sprocket and the sprocket's flatness are unaffected by the tooth formation process, and so that the bearing surfaces of the teeth are smooth. After tooth formation, selected zones of the teeth are then hardened.

3 Claims, 1 Drawing Sheet

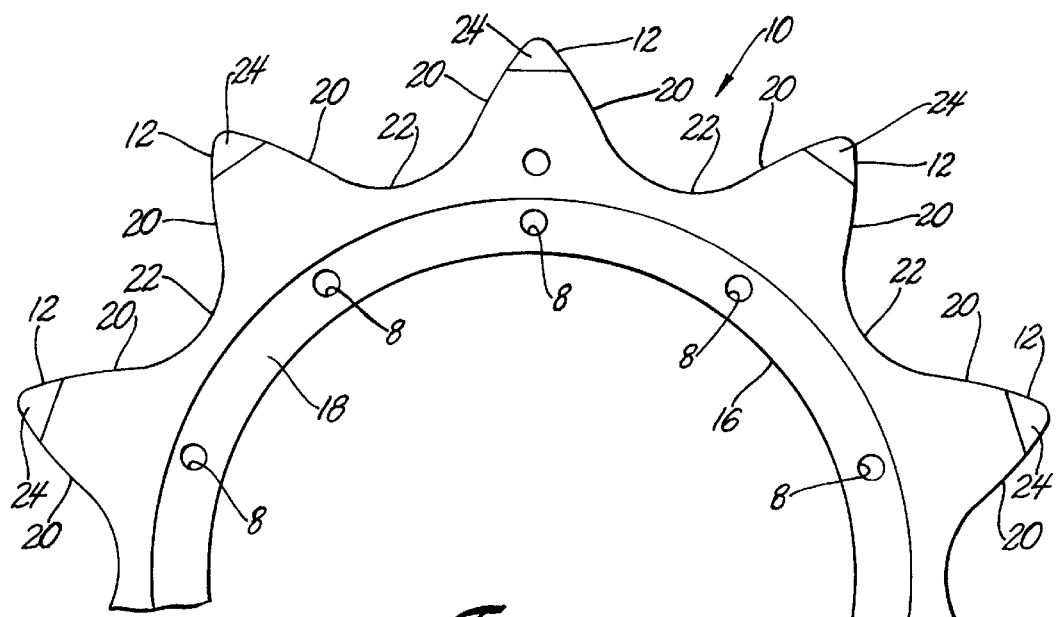
Fig. 1
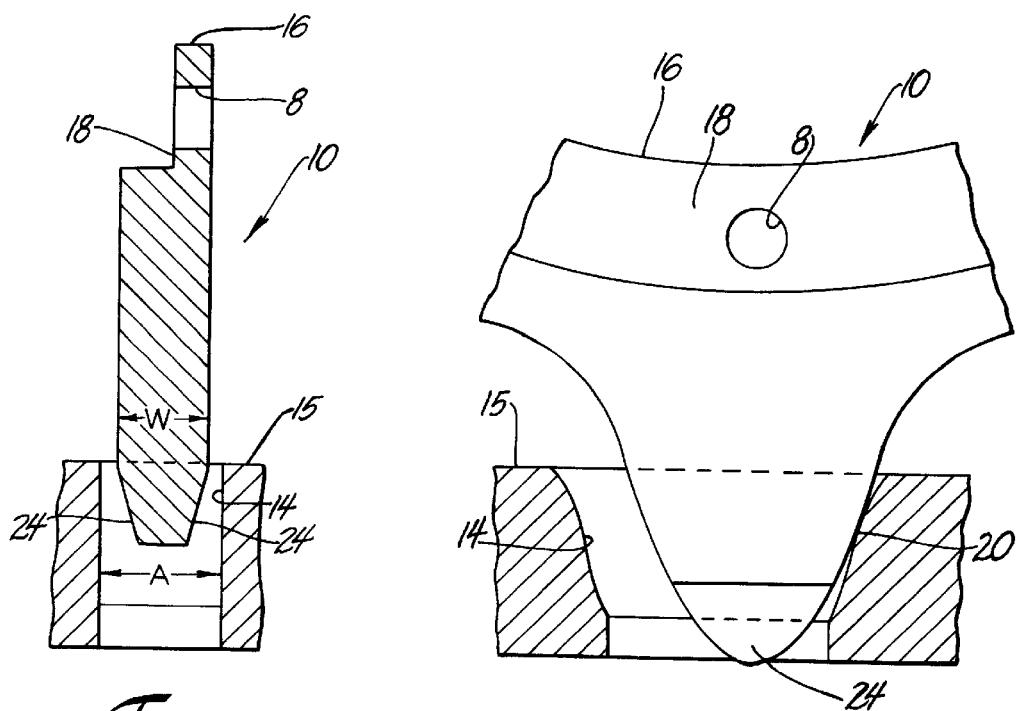
Fig. 2
Fig. 3

METHOD OF MAKING A DRIVE SPROCKET BY WATER JET MACHINING

GOVERNMENT USE

The invention described here may be made, used and licensed by or for the U.S. Government for governmental purposes without paying me any royalty.

BACKGROUND AND SUMMARY

The US Army manages a large fleet of tracked combat vehicles deployed all over the world. One of the chief costs of maintaining this fleet is replacing track components, including drive sprockets for vehicle track assemblies. Track components need relatively frequent replacement because they must endure extreme conditions to which combat vehicles are subjected during military operations. These vehicles must traverse open ground at velocities approaching those of conventional vehicles on roadways. These vehicles must also speed over rough terrain under combat conditions. One reason that replacing track components is expensive is simply the cost of the components themselves, but the costs of shipping and storing these components is also considerable. Additionally, there is labor and overhead cost involved in the process of replacing a worn or broken component, and there is down time for the vehicle.

I have developed a method of fabricating a drive sprocket for the US Army's M113 tracked combat vehicle which I believe will more than double the sprocket's life. My method costs approximately the same as the existing method for fabricating this sprocket. My method can be used for making drive sprockets for other tracked combat vehicles as well. Conceivably, sprockets made by my method can be used for commercial tracked vehicles, though commercial vehicles normally do not undergo the same rigors as combat vehicles.

BRIEF DESCRIPTION OF THE DRAWINGS

FIG. 1 is a partial top view of an M113 drive sprocket.

FIG. 2 is a side sectional view of the sprocket and the immediately neighboring portion of a track shoe pocket.

FIG. 3 is a sectioned detail view showing the engagement between a sprocket tooth and a track shoe pocket.

DETAILED DESCRIPTION

FIG. 1 shows the upper half of a drive sprocket typically used on the US Army's M113 tracked combat vehicle. The sprocket is attached to a conventional hub (not shown) by bolts through holes 8. The sprockets' teeth 12 engage pockets 14 (FIGS. 2 and 3) in track shoes 15 of known design in the M113 vehicle track, the track shoes being linked together by conventional track link elements. The sprocket is formed from flat steel plate stock. Commercial tolerances for flatness and thickness for the plate stock are adequate, especially if the stock is cold rolled.

Before cutting teeth 12 in my method of fabricating sprocket 10, inner diameter 16 is cut from the plate stock. I contemplate that laser cutting inner diameter 16 will be cheaper and faster than the flame cutting technique currently used. Counterbore 18 is machined concentrically with inner diameter 16 and bolt holes 8 are drilled through the counterbore.

Teeth 12 and clearances 20 between the teeth are then formed by water jet machining the bored plate stock. After this machining step, clearances 20 and the entirety of each tooth 12 will retain the original thickness of the plate stock. Bevels 24 are formed subsequently by grinding or other normal machining techniques. Any remaining corners can be ground down or else filed down by hand.

Water jet machining avoids the problems associated with flame cutting, which is the present way of cutting out gears 12. One problem is warping of the plate stock, which requires the sprocket to be machined to regain the required flatness. As a consequence of the machining, the axial thickness of sprocket 10 is reduced. Other problems associated with flame cutting teeth 12 are loss of carbon in the steel at the bearing surfaces 22 of the teeth, coarser grain structure at surfaces 22, unpredictable depth of hardening at those surfaces and excessive brittleness at those surfaces. These latter problems reduce the useful life of teeth 12, and the process of hardening of surfaces 22 after flame cutting does not fully overcome the problems.

After the step of water jet machining the teeth, the sprocket is essentially metallurgically homogeneous. Hardening of sprocket 10 in the zones adjacent surfaces 22 can then be accomplished in conventional fashion.

For the prior design of an M113 drive sprocket, no surface texture is specified for bearing surfaces 22. However, I believe that greater smoothness of surface 22 will prolong the useful life of teeth 12. As perhaps best seen in FIG. 3, it is surface 22 which rolls against the side of track shoe pocket 14 as sprocket 10 drives the vehicle track. Beneficial degrees of surface smoothness at surfaces 22 can be achieved by the same water jet machining step during which teeth 12 are formed. I believe that a surface texture of 250 rms will prolong tooth life greatly, but I prefer a smoother surface texture, of 64 rms, which I deem achievable with no appreciable additional manufacturing cost. It is not necessary for clearances 20 to have any particular surface texture.

One aspect of my sprocket fabrication technique is to assure that the sprocket has an axial width, "W" that is nearer the axial width, "A," of shoe pocket 14 than was done previously for M113 drive sprockets. By axial width, I mean a width parallel to the rotational axis of sprocket 10. In the prior design, the ratio of W to A is typically 0.68 to 0.69, whereas this ratio is 0.72 to 0.79 in my design, and I prefer the ratio to be 0.78 or higher. I believe that a higher ratio of W to A is a factor in increasing tooth life for track driving sprockets of tracked land vehicles. In such vehicles, there is a greater tendency for lateral sliding of tooth bearing surfaces upon a driven element than in other kinds of gear train applications. Specifically, there is a greater tendency for surface 22 to slide against the opposing surface of pocket 14 in a direction parallel to the rotational axis of sprocket 10. My higher ratio of W to A reduces lateral sliding and thereby increases tooth life.

The steel from which the sprocket is formed is a different grade from the steel of which the track shoe is fashioned, the sprocket typically being fashioned from SAE4150 or SAE8150 steel plate steel. The track shoe is typically fashioned from 1345H forging. I have found that the dissimilarity in steels will reduce the coefficient of friction between the sprocket and the track shoe. This, in turn, will reduce wear on bearing surface 20. It is preferred that the steel of the sprocket be harder than the steel of the shoe because there are several times more pockets 14 than teeth in a typical track assembly.

I wish it to be understood that I do not desire to be limited to the exact details of construction or method shown herein since obvious modifications will occur to those skilled in the relevant arts without departing from the spirit and scope of the following claims.

What is claimed is:

1. A method of making a highly durable sprocket for a tracked military vehicle, wherein the tracks are comprised of sets of linked track shoes, the method comprising:

forming flat plates from steel stock of a different grade than the steel from which the track shoes are fabricated, the steel stock being harder than steel of the track shoes;

wherein the thickness of the steel stock is at least 0.72 times an axial width, "A," of a track shoe pocket engaged by teeth of the sprocket;

fashioning the sprocket teeth by water jet machining, whereby the metallurgical structure of the sprocket is essentially homogeneous throughout; leaving the thickness of the steel stock unchanged;

as part of the fashioning step, insuring that bearing surfaces of the teeth have a surface texture of 250 rms or less;

after the fashioning step, hardening selected zones of the teeth.

2. The method of claim 1 wherein the surface texture of the bearing surfaces attained during the fashioning step is 64 rms or less.

3. The method of claim 1 wherein the thickness of the steel stock is at least 0.78 times the axial width, "A," of the track shoe pocket engaged by teeth of the sprocket.

* * * * *